United States Patent [19]

Hochmuth

[11] Patent Number: 6,046,741
[45] Date of Patent: *Apr. 4, 2000

[54] VISUAL COMMAND SEQUENCE DESKTOP AGENT

[75] Inventor: Roland M. Hochmuth, Ft. Collins, Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/976,115

[22] Filed: Nov. 21, 1997

[51] Int. Cl.[7] .................................. G06F 3/00; G06F 9/40
[52] U.S. Cl. .......................... 345/348; 345/339; 345/333; 345/966; 712/215
[58] Field of Search ..................................... 345/339, 348, 345/349, 333, 966, 967; 395/391, 589, 580

[56] References Cited

U.S. PATENT DOCUMENTS

| | | | |
|---|---|---|---|
| 5,117,496 | 5/1992 | Stearns et al. ........................ | 395/680 |
| 5,241,655 | 8/1993 | Mineki ................................... | 345/354 |
| 5,367,626 | 11/1994 | Morioka ................................ | 345/348 |
| 5,448,739 | 9/1995 | Jacobson .............................. | 395/680 |
| 5,491,795 | 2/1996 | Beaudet ................................ | 345/346 |
| 5,673,405 | 9/1997 | Tange ................................... | 345/333 |
| 5,692,143 | 11/1997 | Johnson et al. ..................... | 345/339 |
| 5,790,117 | 8/1998 | Halviatti et al. ..................... | 345/333 |
| 5,859,637 | 1/1999 | Tidwell, II ............................ | 345/336 |

*Primary Examiner*—Raymond J. Bayerl
*Assistant Examiner*—Cuong T. Thai
*Attorney, Agent, or Firm*—Alexander J. Neudeck

[57] ABSTRACT

User commands and command parameters in a graphical user interface are logged in a command log. Repeating patterns of commands and command parameters are automatically detected. This detection is invisible to the user. The user is then prompted to see if a shortcut script should be created for a given repeating pattern of commands and command parameters that has been detected. If the user responds affirmatively, a shortcut script is created that will execute that repeating pattern of commands and command parameters. The user may also be given the option of editing the commands and command parameters before they are made into a shortcut script.

27 Claims, 7 Drawing Sheets

VISUAL COMMAND SEQUENCE DESKTOP AGENT

BACKGROUND OF THE INVENTION

1. Field of the Invention

This invention relates generally to data processing. More particularly, this invention relates to graphical user interfaces. Even more particularly, this invention relates to a system and method of automating user commands input into a graphical user interface system.

2. Background of the Invention

Graphical user interfaces have improved the ease with which many tasks may be accomplished on a computer. In a traditional text-based user interface, a user would have to remember the file name and path of the application, and the arguments given to that application in order to execute it. In a graphical user interface, the user need only activate an icon that represents the application and select the arguments when prompted to execute that application. Since the properties assigned to the graphic icon link it to the executable file and specify its complete directory path, there is no need to memorize that information. Microsoft Corporation's WINDOWS™ and Apple Computer, Inc.'s MacIntosh™ operating systems are examples of successful graphical user interfaces.

Many computer users perform the same sequence of tasks repeatedly. For example, a software developer may repeatedly execute a sequence of three commands that compile a dynamically linked library (DLL), copy the DLL to another directory, and then execute a program. After running the program, debugging the DLL, and possible revising the source code of the DLL, the user may execute the same sequence of three commands that were executed previously. The above sequence of three commands each involve manual invocation through a series of mouse (or other pointing device) movements and button (or key) clicks. Since each command may take anywhere from several seconds, to several minutes to execute, the user is required to wait until each command completes before taking action to execute the next command. Furthermore, continual repetitions of these mouse movements and key clicks can contribute to repetitive stress injuries.

Accordingly, there is a need in the art for a method and system of automating command sequence input into a graphical user interface. It is desirable that such a method should not involve user intervention. Furthermore, such a method should be intuitive to even an unsophisticated user.

SUMMARY OF THE INVENTION

A part of the operating system, or a part of an application, or a separate low priority process, continually runs in the background of a computer and monitors the commands a user invokes. When a user invokes a command, that event is logged. The event log includes the command, the parameters passed to the command, and the date and time the command was executed. When the computer is mostly idle, the event log is analyzed for multiple instances of sequences, or patterns, of commands with the same parameters specified. If the number of instances of a sequence, or pattern, exceeds a specified threshold over a certain period of time, a dialog box is presented to the user. The dialog box asks the user if a shortcut script should be created for that sequence or pattern or commands and their parameters. If the user gives and affirmative response, an icon is placed on the computer desktop that, when chosen by the user, will execute those commands, with their parameters.

DETAILED DESCRIPTION OF THE PREFERRED EMBODIMENTS

Figure 1:
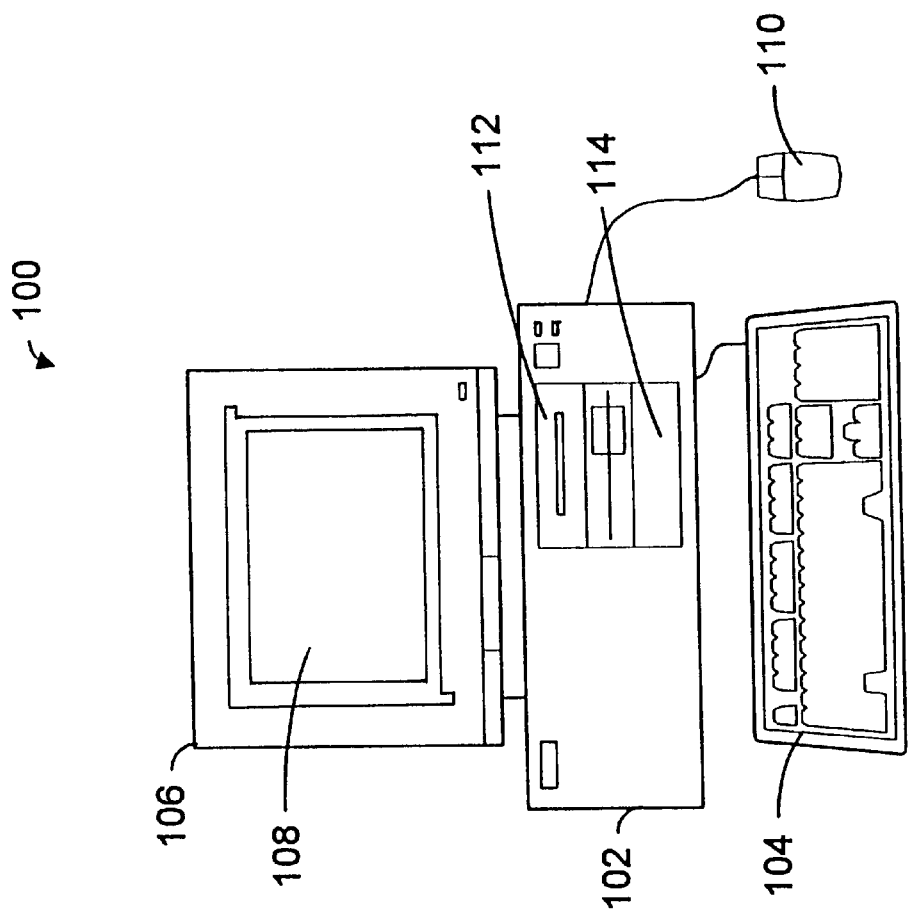
FIG. 1 is a block diagram of a computer suitable for use in implementing the present invention.
Figure 2:
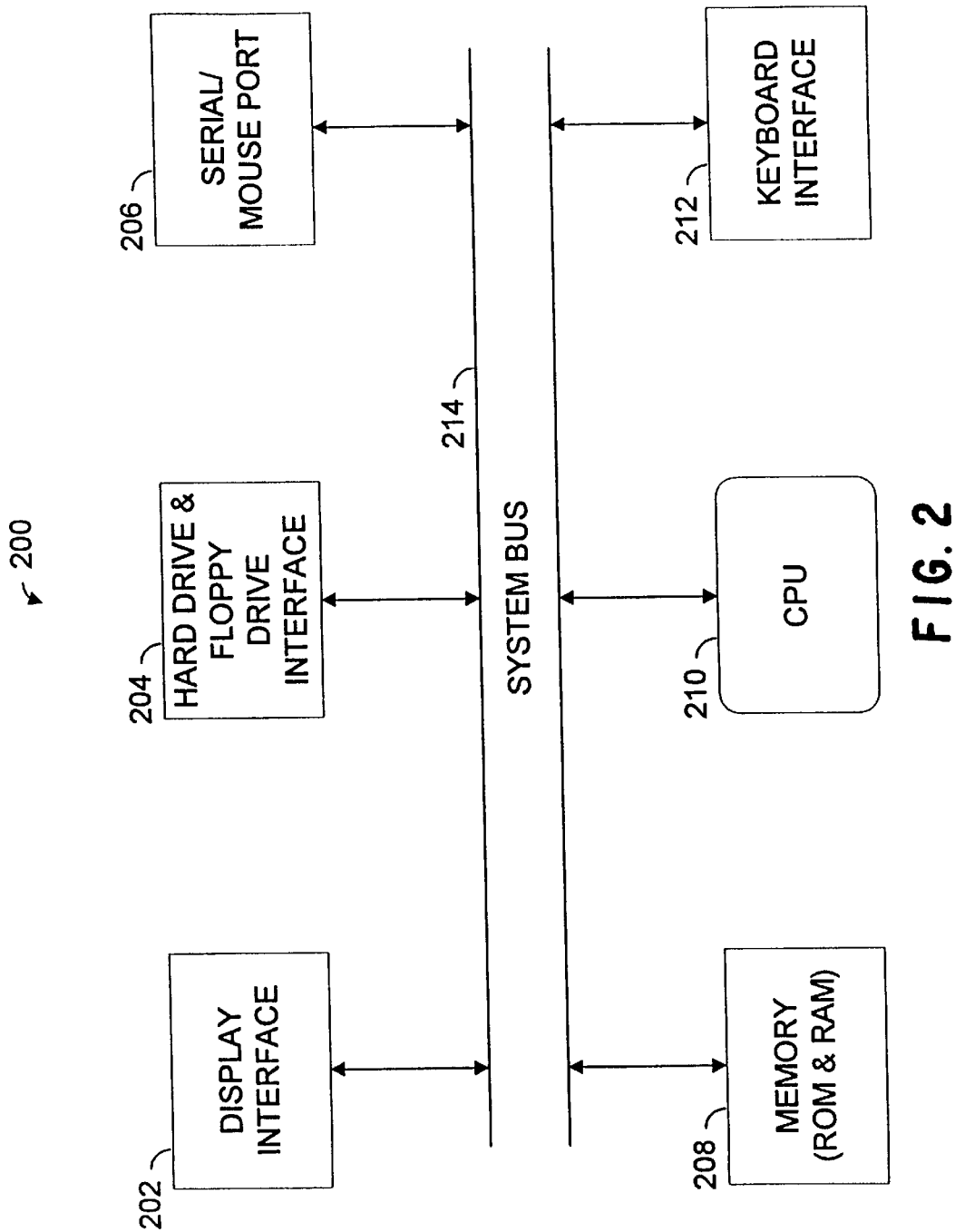
FIG. 2 is a block diagram showing the interconnection of some of the principle components inside the processor chassis of FIG. 1.

FIG. 1 illustrates a computer 100 that is suitable for implementing the present invention. Computer 100 includes a chassis 102 containing one or more circuit boards (not shown), a floppy drive 112, and a hard drive 114. A representative block diagram of the elements included on the circuit boards inside chassis 102 is shown in FIG. 2. A central processing unit (CPU) 210 is connected to a system bus 214. System bus 214 also connects to memory 208 that includes both read only memory (ROM) and random access memory (RAM); a display interface 202 that controls monitor 106 to display images on screen 108; a hard drive and floppy drive interface 204 that controls hard drive 114 and floppy drive 112; a serial/mouse port that communicates with mouse 110 to allow the user to manipulate a cursor or other graphical objects; and a keyboard interface 212 that communicates with keyboard 104 to allow the user to enter text or keystroke commands. Although many other components of computer 100 are not shown, such components and their interconnection are well known to those of ordinary skill in the art. Accordingly, further details concerning the construction and composition of computer 100 and the circuit boards inside chassis 102 need not be disclosed with the present invention.

Figure 3:
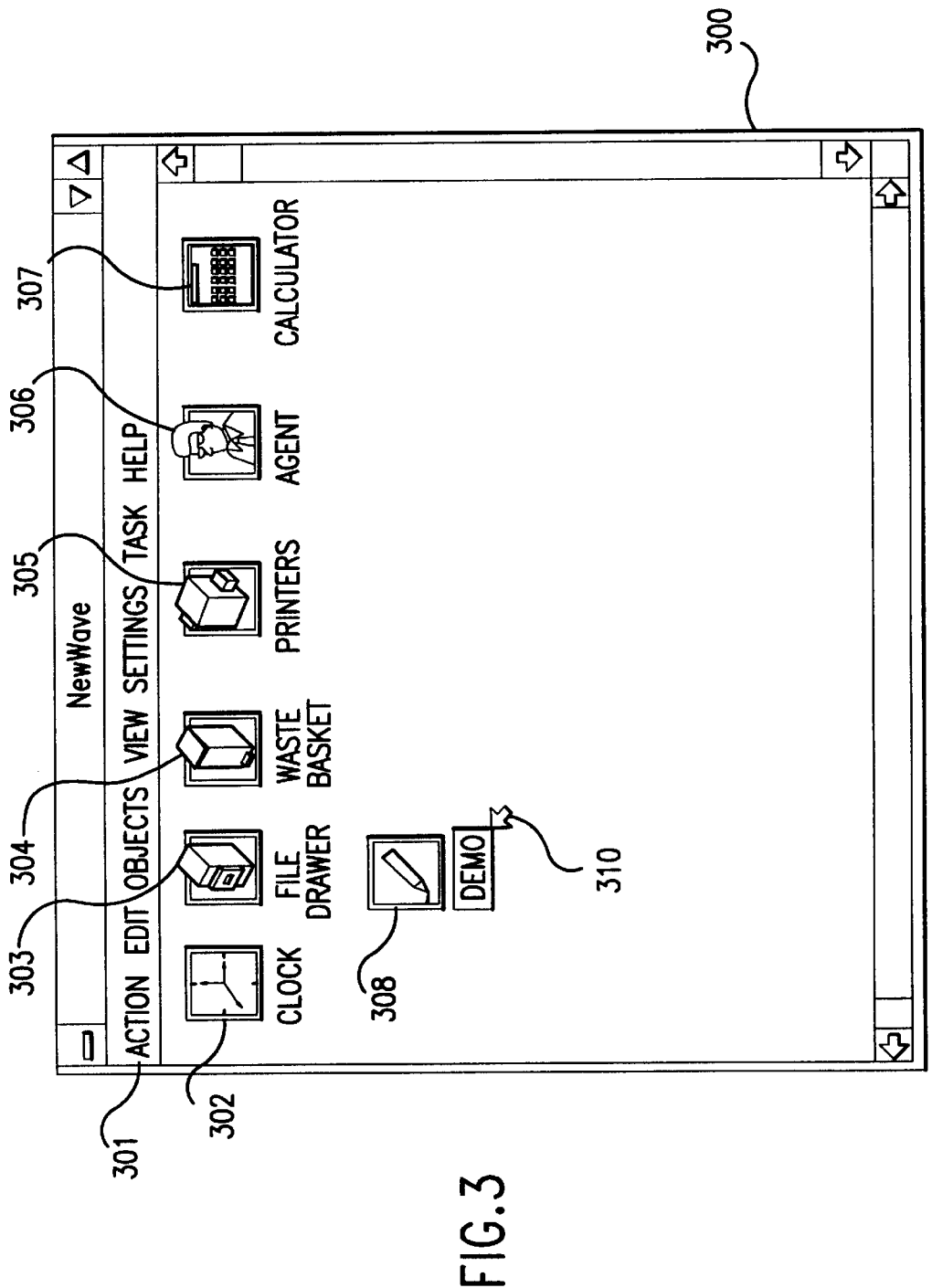
FIG. 3 illustrates the appearance of a desktop metaphor as used by a graphical user interface.

When the computer 100 is running, program instructions stored on a floppy disk in floppy drive 114, or on hard drive 114, or in memory 208 that comprise a graphical user interface (GUI) program are executed by CPU 210 causing the graphical elements that comprise the user's view of the graphical user interface to be displayed on screen 108. FIG. 3 shows the appearance of screen 108 with one possible graphical user interface displayed. The GUI displays a window 300 with a menu bar 301. Inside window 300 icons are displayed that each represent an object. For example icons 302, 303, 304, 305, 306, 307, and 308 are shown. Each of these icons represent a file, a program, a shortcut, a shortcut script, or a tool. For example, icon 308 represents an object called DEMO that is associated with a word processing program. Object DEMO may be opened by using mouse 110 to place cursor 310 over icon 308, and depressing a button on mouse 110 twice in quick succession.

Figure 4:
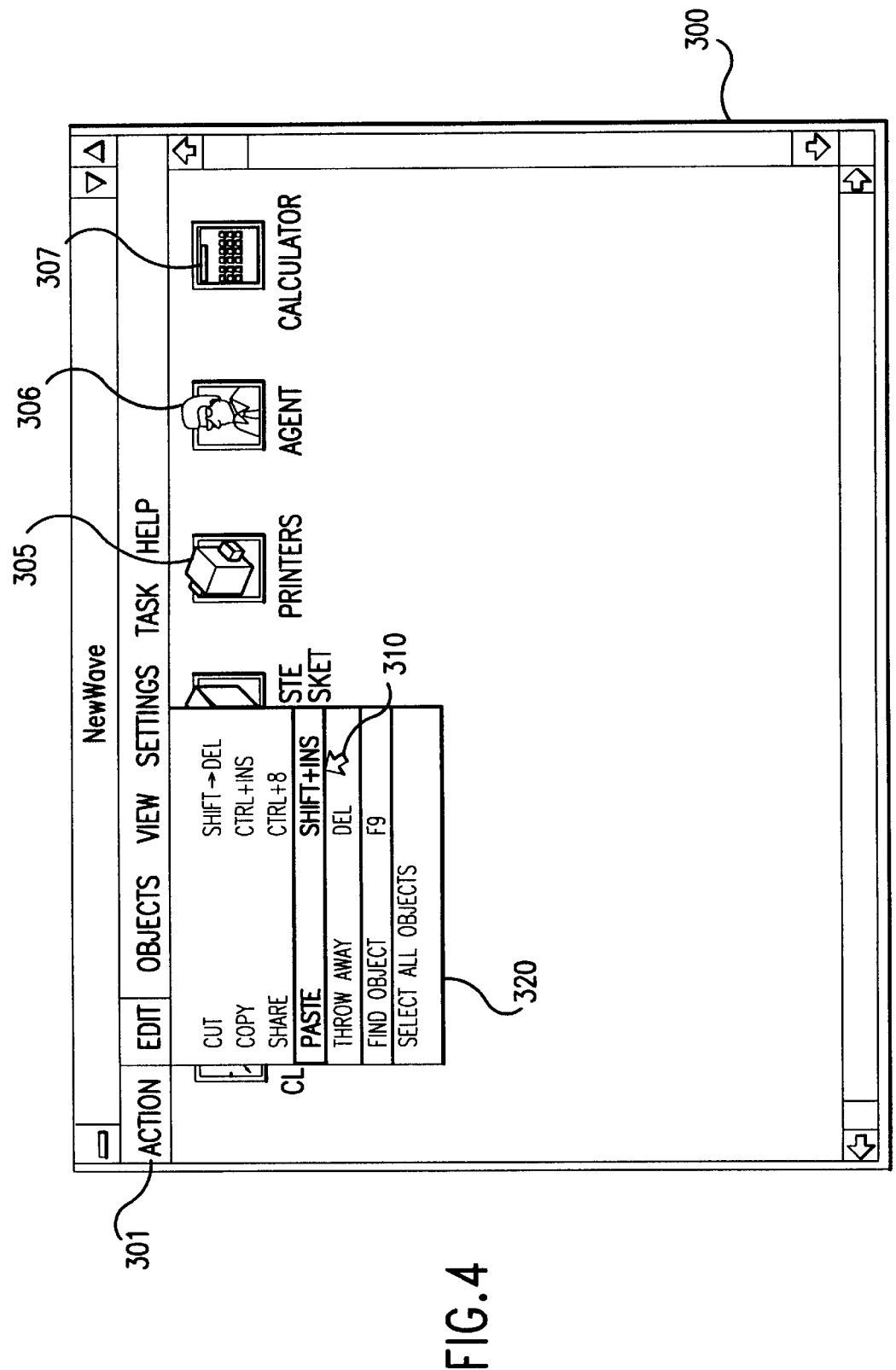
FIG. 4 illustrates the use of a pull-down menu as used by a graphical user interface.

Another way actions are accomplished by the user using a GUI is through the use of pull-down menu 301. This is illustrated in FIG. 4. Cursor 310 is first positioned on pull-down menu 301 over the desired class of actions and a mouse button depressed. In FIG. 4, the class of actions selected were the "Edit" commands. This causes pull-down menu 320 to appear. Pull-down menu 320 displays a number of possible commands, actions, or files that the user may select. The user then positions cursor 310 over the desired choice and depresses a mouse button. The GUI then takes the appropriate action in response to the user's choice.

As can be seen from the examples, above, many mouse button presses, and much positioning of the cursor may be required to execute even a simple command. Accordingly, many GUIs, such as Microsoft WINDOWS™, include the ability to create a shortcut. Shortcuts are quick ways to get to the programs and documents that are used often. For example, if the user creates a shortcut to run a word processor, an icon of a pen and paper will appear on the computer desktop displayed on the screen. Then, to run the word processor, the user just presses a mouse button twice while the cursor is over the pen and paper icon, and it will run the word processor. Alternatively, to edit a particular document in the word processor, the user may drag and drop the icon representing that document on the pen and paper icon, and the word processor will start up and load that document for editing. Shortcut scripts are different from shortcuts in that they may be used to execute many different kinds of commands, or automate long command sequences. However, shortcut scripts may be difficult to create, and may require programming knowledge uncharacteristic of an unsophisticated user.

Each series of user actions can be represented by a text based command and parameters. For example, take the following series of GUI operations performed by the user: (1) the cursor is placed over an icon that represents a file called "DEMO" and the mouse button is depressed once. This selects the file DEMO. (2) Then the command "Rename" is selected from a pull-down menu. (3) The user is prompted for, and supplies a new file name "REMO." This series of graphical commands can be represented by a single textual command to the disk operating system of "MOVE DEMO REMO". Of course, a textual form is not the only way to represent the command but is used here for illustrative purposes.

Figure 5:
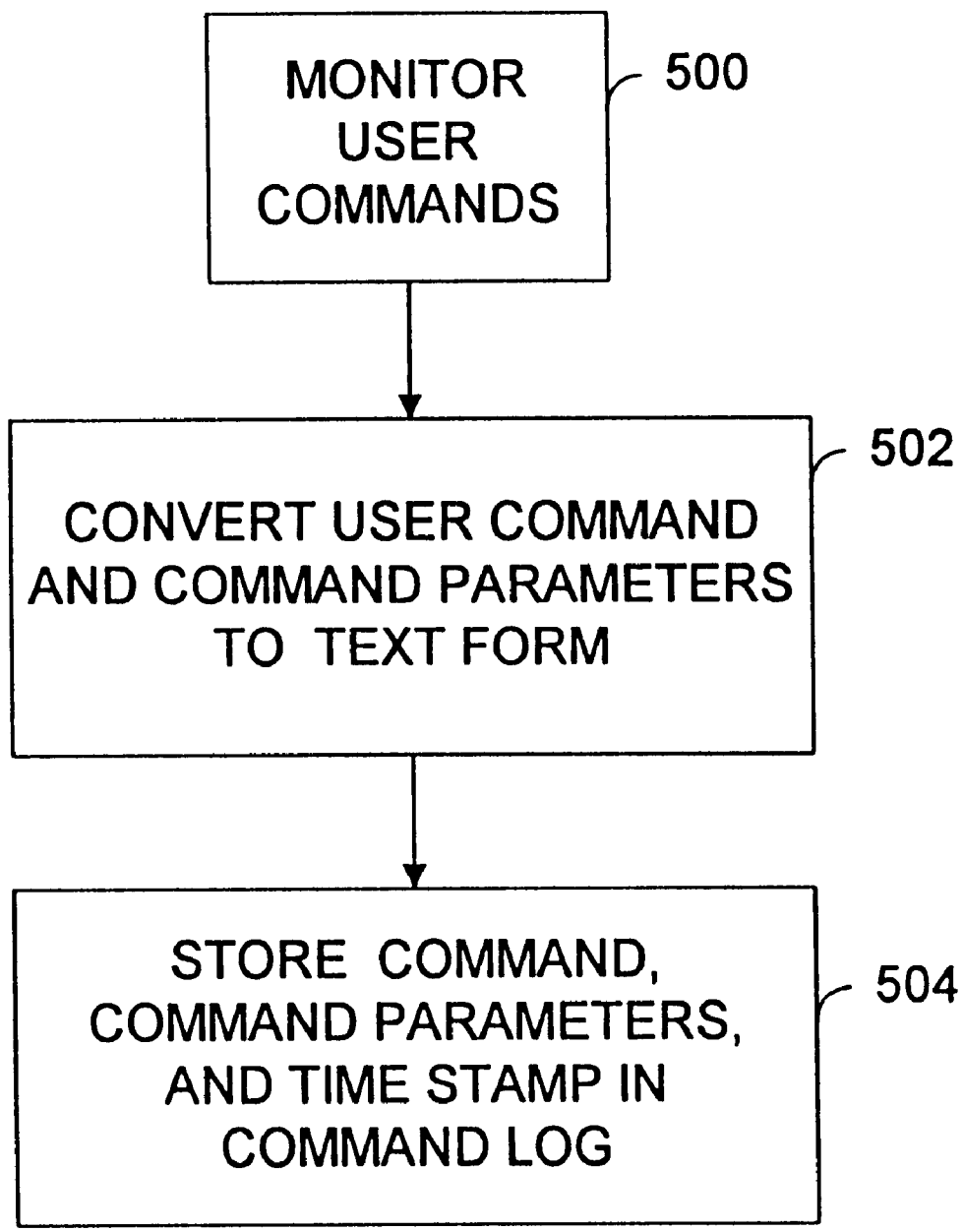
FIG. 5 is a flow chart illustrating the steps to log visual commands and their parameters.

FIG. 5 is a flow chart that summarizes the steps that may be used to log GUI commands and parameters. All, or part, of these steps may be done by the GUI, the operating system, a low-level process running in the background, an application, or any combination of the preceding. In a step 500, the user's commands and parameters are monitored. In a step 502, each command and it's parameters are converted to text form. In a step 504 the text form of each command, and it's parameters, are stored in a log along with a time stamp indicating when the command was executed. This command log may be stored in memory or on a disk. Furthermore, in step 502 the command and it's parameters may be converted to some form other than a textual representation, such as a proprietary binary format, before being stored in the command log.

Figure 6:
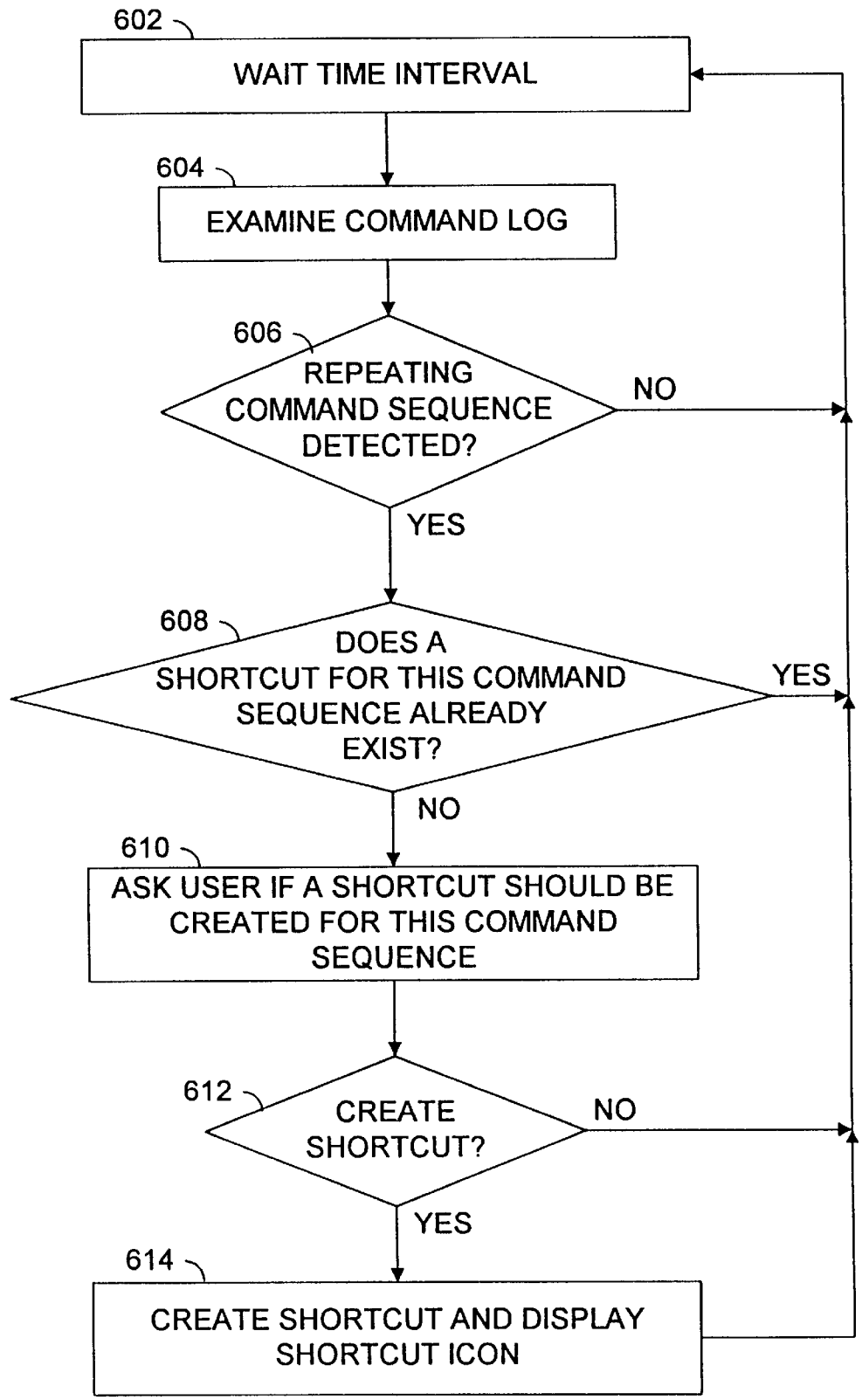
FIG. 6 is a flow chart illustrating the steps to create a command sequence shortcut script.

FIG. 6 is a flow chart that summarizes the steps that may be used to automatically create a command sequence shortcut script. In a step 602 a time interval is waited. This time interval may be measured in time units, or as a predetermined number of GUI commands. It may also be desirable to wait until the computer 100 is mostly idle so that the process to automatically create a shortcut script does not slow the execution of other computer tasks. In a step 604 the command log is examined for repeating sequences of commands and parameters, or patterns of commands and parameters. This may be done by successively taking each command and it's parameters in the command log and comparing it with every other command and it's parameters in the command log to see how many occurrences of that command and the same parameters has occurred. If a command with the same parameters has occurred more than a threshold number of times, the commands in the log that occurred within a few commands before, and a few commands after that command can be examined to see if those command have occurred in the same sequence and roughly the same number of times as that command. If they have, a repeating command sequence has probably been detected. The threshold number of times a command, or pattern of commands, must occur before it is considered a pattern may be initially set to a default value. However, it is desirable to let the user adjust that value through a variety of means that are well known in the art. Other methods of detecting repeating sequences, such as self-correlating the command log, are also well known in the art and as such, need not be further detailed here.

In a step 606, if a repeating sequence has not been detected, the process loops back to step 602 to wait a predetermined time interval. If a repeating sequence has been detected, step 608 checks to see if a shortcut script for the detected sequence has already been created. If it has, there is no reason to create another one and the process loops back to step 602 to wait a predetermined time interval. In a step 610, the user is asked if a shortcut script should be created for this command sequence. This step is optional. It is desirable, however, to ask the user if a shortcut script should be created so the user will not be surprised by the appearance of a new shortcut script icon, and to allow the user to avoid clutter on the screen.

Figure 7:
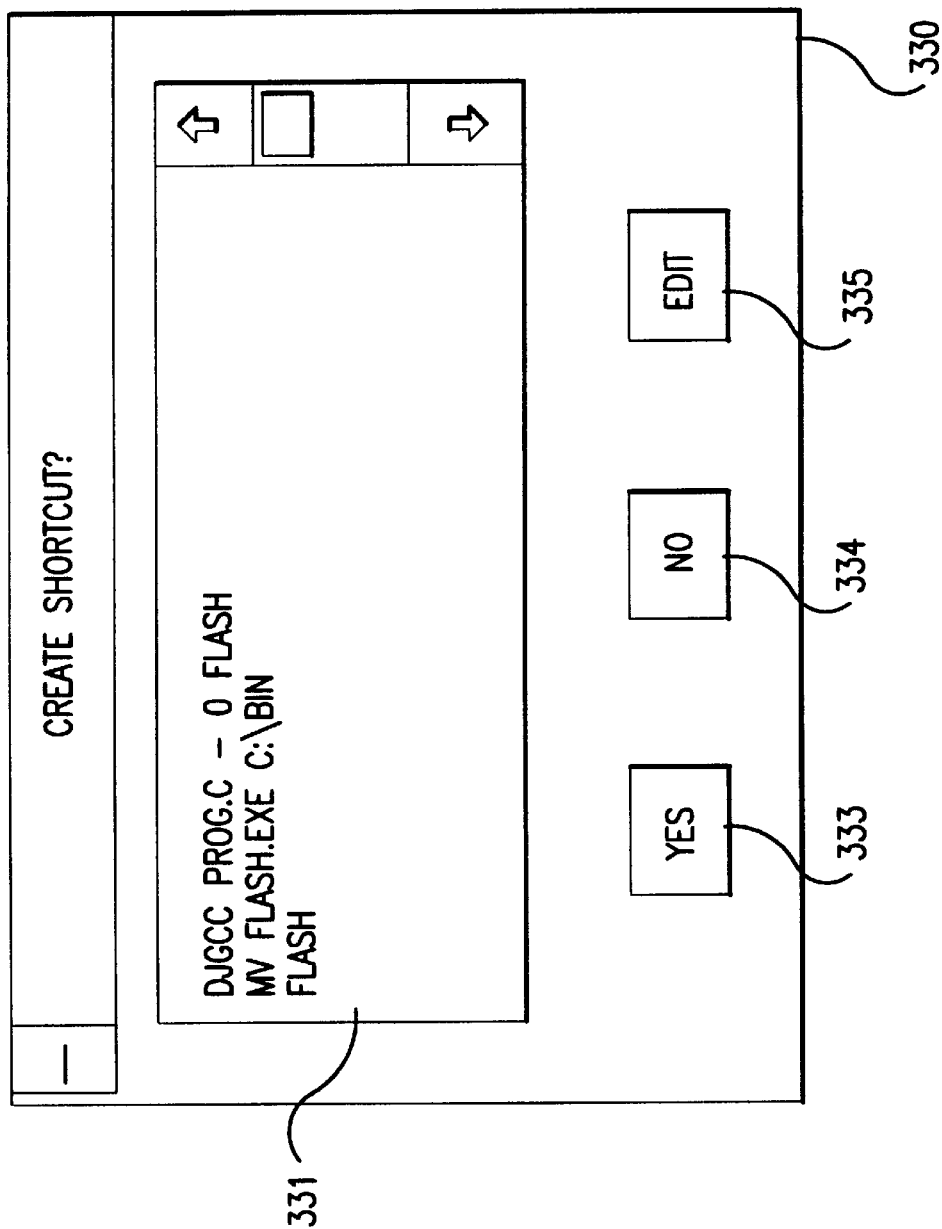
FIG. 7 illustrates an example of a dialog box that can be used to interrogate the user whether or not a shortcut script should be created.

FIG. 7 illustrates an example of a dialog box 330 displayed on screen 108 that can be used to ask the user if a shortcut script should be created for a command sequence. A textual representation of the command sequence 331 is displayed so the user may examine the commands that will be included in the shortcut script. The user may then choose to create a shortcut script by positioning the cursor over the "YES" button 333 and depressing a mouse button. Alternatively, the user may choose not to create a shortcut script by positioning the cursor over the "NO" button 334 and depressing a mouse button. Another alternative would be for the user to choose to edit the command sequence. This could be done by positioning the cursor over the "EDIT" button 335 and depressing a mouse button. The GUI would then allow the user to add, delete, or change the commands and parameters in the command sequence. The user would then be given the opportunity to make a shortcut script out of the modified command sequence.

In a step 612 if the user elected not to create a shortcut script, the process loops back to step 602 to wait a predetermined time interval. The process may optionally delete one or more instances of the command sequence from the command log so that the user will not be asked if a shortcut script should be created for that command sequence until that command sequence has been repeated more times. If the user elected to create a shortcut script, step 614 creates the shortcut script, and places an icon representing that shortcut script on screen 108. Once an icon representing a shortcut script is displayed on the screen, all the GUI commands that affect other types objects may be applied to the shortcut script. (i.e. it may be copied, moved, edited, deleted, etc.)

The above description is included to illustrate the preferred embodiments. It is not meant to limit the scope of the invention. The scope of the invention is to be limited only by the following claims. From the above discussion, many variations will be apparent to one skilled in the art that would yet be encompassed by the spirit and scope of the invention.

I claim:

1. A computer operable method, comprising the steps of:
 (a) logging a plurality of commands executed by a user of a graphical user interface (GUI) in a command log;

(b) automatically detecting a repeating pattern of commands in said command log; and, (c) creating a shortcut script that will execute said repeating pattern of commands.

2. The method of claim 1, further comprising:

(d) displaying an icon representing said shortcut script on a computer screen.

3. The method of claim 1, wherein step (c) includes:

(c.1) prompting a user for a user response; and (c.2) creating said shortcut script in response to said user response.

4. The method of claim 3 wherein said user may edit said repeating pattern of commands.

5. The method of claim 1 wherein step (a) includes logging said plurality of commands with command parameters.

6. The method of claim 5 wherein detecting a repeating pattern of commands in said command log includes detecting a repeating pattern of commands with command parameters and wherein said shortcut script will execute said repeating pattern of commands with command parameters.

7. The method of claim 1, wherein step (a) includes:

(a.1) converting each of said plurality of commands into a textual form; and, (a.2) storing said textual form of each of said plurality of commands.

8. The method of claim 7 wherein step (a) includes logging said plurality of commands with command parameters and step (a.1) includes converting each of said plurality of commands with command parameters into said textual form and step (a.2) includes storing said textual form of each of said plurality of commands with command parameters.

9. The method of claim 8, wherein said repeating pattern of commands is displayed in said textual form and a user may edit said repeating pattern of commands.

10. A program storage medium readable by a computer, tangibly embodying a program of instructions executable by the computer to perform method steps for automatically creating a shortcut script in a graphical user interface (GUI), said method steps comprising:

(a) logging a plurality of commands executed by a user of said GUI in a command log;

(b) automatically detecting a repeating pattern of commands in said command log; and, (c) creating a shortcut script that will execute said repeating pattern of commands.

11. The program storage medium of claim 10, wherein said method steps include:

(d) displaying an icon representing said shortcut script on a computer screen.

12. The program storage medium of claim 10, wherein said method step (c) includes:

(c.1) prompting a user for a user response; and (c.2) creating said shortcut script in response to said user response.

13. The program storage medium of claim 12 wherein said user may edit said repeating pattern of commands.

14. The program storage medium of claim 10, wherein said method step (a) includes logging said plurality of commands with command parameters.

15. The program storage medium of claim 14 wherein detecting a repeating pattern of commands includes detecting a repeating pattern of commands with command parameters in said command log and wherein said shortcut script will execute said repeating pattern of commands with command parameters.

16. The program storage medium of claim 10, wherein said method step (a) includes:

(a.1) converting each of said plurality of commands into a textual form; and, (a.2) storing said textual form of each of said plurality of commands.

17. The program storage medium of claim 16 wherein said method step (a) includes logging said plurality of command with command parameters and said method step (a.1) includes converting each of said plurality of commands with command parameters into said textual form and said method step (a.2) includes storing said textual form of each of said plurality of commands with command parameters.

18. The program storage medium of claim 17, wherein said repeating pattern of commands is displayed in said textual form and a user may edit said repeating pattern of commands.

19. A graphical user interface (GUI) that is implemented on a computer, said GUI including graphical commands, comprising:

(a) means for logging a plurality of graphical commands executed by a user of said graphical user interface in a command log;

(b) means for automatically detecting a repeating pattern of graphical commands in said command log; and, (c) means for creating a shortcut script that will execute said repeating pattern of graphical commands.

20. The GUI of claim 19, further comprising:

(d) means for displaying an icon representing said shortcut script on a computer screen.

21. The GUI of claim 19, wherein said means for creating a shortcut script includes:

(c.1) means for prompting a user for a user response; and (c.2) means for creating said shortcut script in response to said user response.

22. The GUI of claim 21 wherein said user may edit said repeating pattern of graphical commands.

23. The GUI of claim 19 wherein said means for logging a plurality of graphical commands includes logging said plurality of graphical commands with command parameters.

24. The GUI of claim 23 wherein said means for detecting a repeating pattern of graphical commands in said command log includes means for detecting a repeating pattern of graphical commands with command parameters and wherein said shortcut script will execute said repeating pattern of graphical commands with command parameters.

25. The GUI of claim 19, wherein said means for detecting a repeating pattern of graphical commands in said command log includes:

(a.1) means for converting each of said plurality of graphical commands into a textual form; and, (a.2) means for storing said textual form of each of said plurality of graphical commands.

26. The method of claim 25 wherein said means for detecting a repeating pattern of graphical commands in said command log includes means for logging said plurality of graphical commands with command parameters and said means for converting each of said plurality of graphical commands into a textual form includes converting each of said plurality of graphical commands with command parameters into said textual form and said means for storing said textual form of each of said plurality of graphical commands includes storing said textual form of each of said plurality of graphical commands with command parameters.

27. The GUI of claim 26, wherein said repeating pattern of graphical commands is displayed in a textual form and a user may edit said textual form of said repeating pattern of graphical commands.

* * * * *